UNITED STATES PATENT OFFICE.

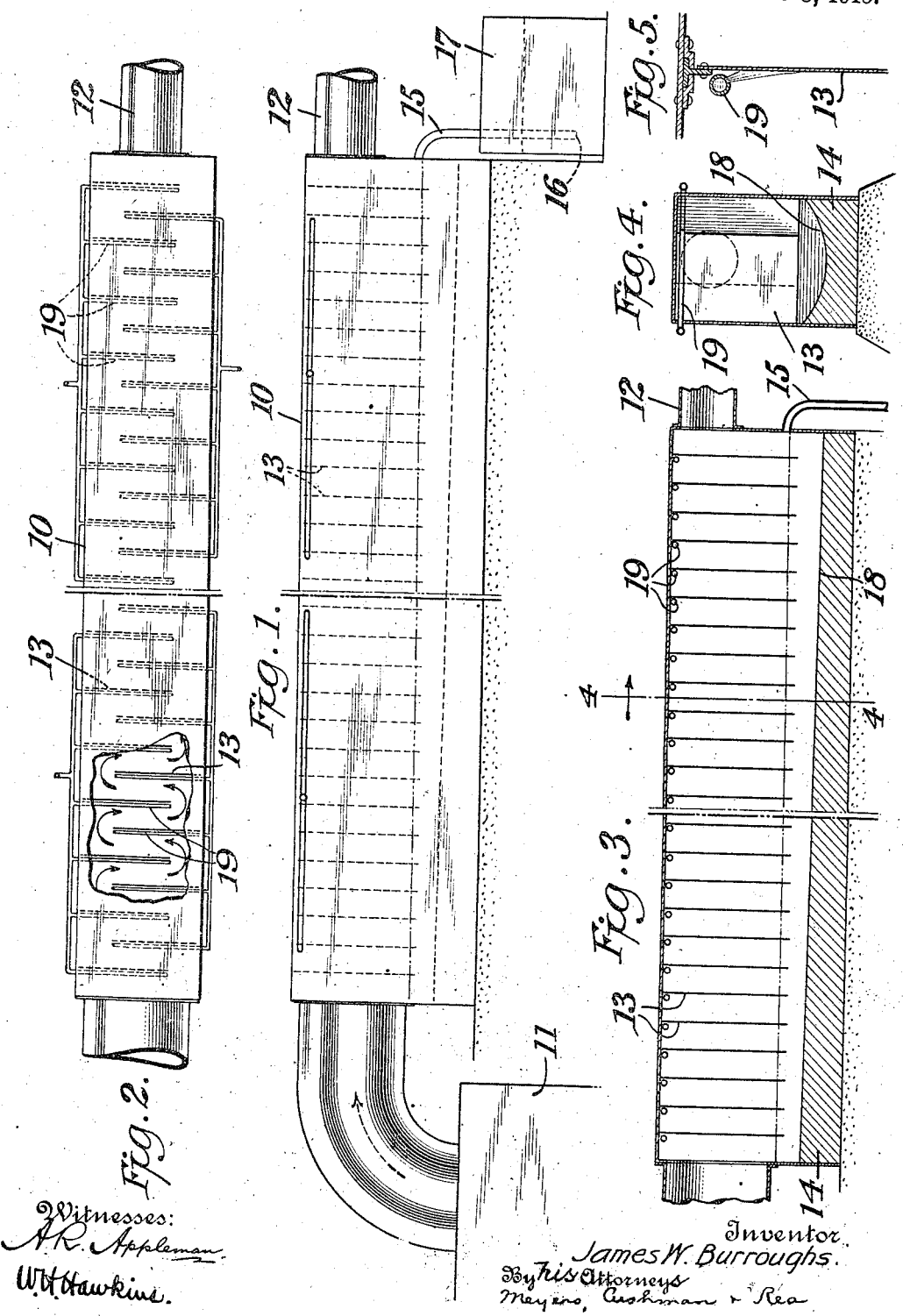

JAMES W. BURROUGHS, OF IRVINGTON, NEW YORK.

PROCESS FOR MAKING PHOSPHORIC ACID.

1,142,397.  Specification of Letters Patent.  Patented June 8, 1915.

Application filed March 18, 1914. Serial No. 825,492.

*To all whom it may concern:*

Be it known that I, JAMES W. BURROUGHS, a citizen of the United States, residing at Irvington, in the county of Westchester and State of New York, have invented new and useful Improvements in Processes for Making Phosphoric Acid, of which the following is a specification.

This invention relates to the preparation of phosphoric acid and my apparatus and process are most conveniently operated in conjunction with a furnace, such as an electric furnace in which phosphate rock is used as a raw material. It is usual in such furnaces to heat the phosphate rock with a flux such as sand or other silicious material. The gases are composed of phosphorus and silica.

A principal object of my invention is to provide a simple process for effectively separating the phosphorus from the silicious or calcium ingredients of the gas, and to collect the phosphorus with as little waste as possible of phosphorus in the waste gases which pass from the apparatus.

Heretofore gases produced by the distillation of phosphate rock and which are composed of phosphorus calcium and silica or other ingredients have been treated for this general purpose in towers formed of brick work, presenting passages through which the gases pass; such towers are known popularly as absorption towers, and in their operation, water is permitted to trickle through the passages through which the gases pass, the object of employing the water being to decompose the gas and absorb the phosphorus. In these towers there is a continual deposit of calcareous silicious compounds or sand which eventually clogs up the passages and makes it necessary to overhaul and clean the tower. In these towers also there appears to be another deposit in addition to the silica or sand referred to above, and this deposit to which I now refer includes a considerable quantity of phosphorus in an insoluble state, which is lost for all intents and purposes of the process, that is it is not carried off with the absorption water as it should be.

One of the objects of my invention is to overcome these defects in operation of absorption towers, and to provide a process whereby the phosphorus is more effectively separated from the gas; and in which the process may be continuously carried on.

My invention resides in the process to be described more fully hereinafter.

In the drawing, which represents one embodiment of my apparatus Figure 1 is a side elevation diagrammatically illustrating a container in which the gas is received from the furnace. Fig. 2 is a plan of the container shown in Fig. 1. Fig. 3 is a longitudinal section through the container. Fig. 4 is a vertical cross section through the container. Fig. 5 is a vertical section taken through a part of the container and illustrating the preferred manner of supporting depositories, which may constitute a feature of the invention.

A gas having such a composition as that described, in cooling, will arrive at a certain temperature beyond which the phosphorus will not be eliminated by the decomposing agent, and this I believe is the reason for the deposit in absorption towers of phosphorus in a form which is not soluble or decomposable by the water. According to my process I maintain the temperature of the body or entire volume of the gas above a predetermined point, which is from 700 to 900 degrees centigrade, depending upon circumstances, such as the speed of driving the fan and the temperature of the incoming gases, etc. I cool the molecules of the gas locally at a plurality of points, but prevent the body of the gas falling below this predetermined point, namely 700 to 900 degrees centigrade.

The preferred apparatus for carrying out my process comprises a container 10, which is preferably of elongated form and arranged so that the gas moves through it in a column, said gas being admitted from a furnace, part of which is indicated at 11. The column of gas is drawn through the container preferably by means of an exhaust fan connected to an outlet 12.

I cause a circulation or relative movement among the molecules of the gas in passing through the container and cool them in the presence of water, which decomposes the gas. This is preferably effected by causing the gases to pass through a tortuous path. I provide depositories in the path of the gas which are preferably in the form of metal plates 13 which extend outward alternately from the opposite side walls of the container. A sludge containing phosphorus will collect on the depositories. The bottom 14 of the container is preferably slightly dished so as to collect the sludge which forms on the depositories, and at a short distance above the bottom an overflow 15 is arranged for the sludge. The level of this overflow 15 is slightly above the lower edges of the plates or depositories 13 so as to form a seal or trap under the plates, and force the gases to pass to and fro in a horizontal plane around the vertical edges of the plate in succession. This overflow 15 extends downwardly into a sludge tank 17 in which its delivery mouth 16 is depressed so that the sludge or acid in the tank forms an air seal or trap to prevent entrance of air into the container at this point. I may simply let the water drip through the horizontally advancing column of gas to reduce its temperature locally.

The baffle plates are intended to operate as locally cooled points in contact with which the molecules of the gas come as they pass through the container, for I have discovered that if this hot calcareous or silicious phosphoric gas is cooled in the presence of a substance such as water the oxid of phosphorus will combine with or be absorbed by the water, and form a silicious sludge. This sludge tends to form on or collect upon the depositories 13 and these plates or depositories will drain into the common collecting point or dish 18 at the bottom.

I prefer to use water to break up the gas, and this is preferably introduced by injecting it within the gas from perforated cross pipes 19 preferably arranged near the upper edges of the plates, so that a spray issues from the pipes onto or toward the plates. This water may be at any ordinary temperature such as 60 degrees Fahrenheit. The gases enter the container from the furnace at a high temperature, say 1500 degrees centigrade, and as they pass through the container the molecules of the gas are cooled at a plurality of points, where they come into contact with the depositories or baffle plates. These plates have a relatively large area and they admirably perform their function of cooling the molecules of the gas.

In practice the apparatus is regulated so that substantially all the phosphorus will be eliminated from the gas before it passes from the container. With my apparatus the process can be carried on continuously, because the sludge which forms upon the plates drains into the dish 18 and continuously overflows into the sludge tank. With my process it is unnecessary to use a large quantity of water; this is desirable as this simplifies the process of removing the phosphoric acid from the sludge. In order to remove the phosphoric acid from the sludge it is only necessary to mix it when desired with a larger quantity of water which immediately takes up the phosphoric acid in solution, and after being allowed to settle the phosphoric acid can be decanted.

It is understood that the process described above is only one embodiment of the many forms or embodiments my process may take, and I do not wish to be limited in the construction of my claims, nor in the practice of my process, to the particular process described above.

What I claim is:—

1. The process which consists in fusing phosphatic material and a flux in a furnace to form a gas containing phosphorus, treating the gas passing from the furnace with a substance adapted to decompose the gas, and maintaining the temperature of the gas above a predetermined point until substantially all the gas has been decomposed by said substance.

2. The process which consists in fusing phosphatic material and a flux in a furnace to form a gas containing phosphorus, treating the gas passing from the furnace with a substance which is adapted to decompose the gas, locally cooling the molecules of the gas and maintaining the gas above its critical temperature.

3. The process which consists in fusing phosphatic material and a flux in a furnace to form a gas containing phosphorus, treating the gas passing from the furnace with a substance adapted to decompose the gas, locally cooling the molecules of the gas at a plurality of points and maintaining the temperature of the gas above the condensing point of said gas.

4. The process which consists in fusing phosphatic material and a flux in a furnace to form a gas containing phosphorus, treating the gas passing from the furnace with a substance adapted to decompose the gas, locally cooling the molecules of the gas at a plurality of points, and maintaining the temperature of the gas above the critical point of said gas, and causing a movement of the molecules of the gas to bring them into contact with the locally cooled points and facilitate their decomposition.

5. The process which consists in causing a volume of phosphoric gas to come in contact with water to decompose the gas, and maintaining the temperature of the said gas above a predetermined point until substantially all the gas has been decomposed.

6. The process which consists in causing a volume of silicious phosphoric gas to come in contact with water to locally cool the molecules of the gas to decompose the same with said water, and maintaining the temperature of the said gas above a predetermined point.

7. The process which consists in advancing a column of hot phosphoric gas into contact with water at a plurality of points moving transversely to the direction of advance of the column of gas to decompose the gas.

8. The process which consists in advancing a column of hot phosphoric gas into contact with water at a plurality of points moving transversely to the direction of advance of the column of gas to decompose the gas, and maintaining the temperature of the gas above a predetermined point while the decomposition is progressing.

9. The process which consists in fusing phosphatic material and a flux in a furnace to form a gas containing phosphorus, treating the gas passing from the furnace with a substance which is adapted to decompose the gas and maintain the temperature of the gas above 700 degrees centigrade until substantially all the gas has been decomposed by the said substance.

10. The process which consists in fusing phosphatic material and a flux in a furnace to form a gas containing phosphorus, and passing the gas coming from the furnace into contact with a substance adapted to decompose the gas without reducing the temperature of the body of the gas below a predetermined point.

In testimony whereof I have hereunto set my hand in presence of two subscribing witnesses.

JAMES W. BURROUGHS.

Witnesses:
F. D. AMMLEE,
L. A. HAMMERSLEY.